March 1, 1960

L. C. TOTH 2,926,968

TRACK ROLLER MOUNTING MEANS FOR ENDLESS TRACK VEHICLES

Filed Feb. 27, 1957

Inventor
Louis C. Toth
Paul O. Pippel
Attorney

2,926,968

TRACK ROLLER MOUNTING MEANS FOR ENDLESS TRACK VEHICLES

Louis C. Toth, Chicago, Ill., assignor to International Harvester Company, Chicago, Ill., a corporation of New Jersey Application February 27, 1957, Serial No. 642,701

2 Claims. (Cl. 305—1)

This invention relates to endless track vehicles and is primarily concerned with a track roller mounting on a crawler tractor.

An object of the invention is to provide a means of installing a shaft of a track roller in a single predetermined position in a track frame of an endless track vehicle so that rotating parts of the track roller will be adequately lubricated.

Another object of the invention is to provide a means of preventing rotation of a shaft of a track roller from a single predetermined position of installation on a track frame of an endless track vehicle so as to get the best lubrication from the lubrication arrangement.

A further object of the invention is to provide a means of securing a shaft of a track roller to a track frame of an endless track vehicle and also including a single predetermined position of installation of the shaft in the track frame and further to prevent the shaft from rotating in the track frame after it has been installed on the vehicle without added cost over the prior means of securing the shaft to the track frame.

The foregoing and other objects of the invention will be apparent from the construction and arrangement illustrated in the accompanying drawings wherein.

The invention proposes a means of installing a shaft of a track roller in a predetermined position and to prevent the shaft from rotating after it has been installed on the vehicle. The invention comprises an eccentric recess in one end of the shaft and concentric recesses in the track frame guide of different sizes and the shaft is disposed in one of the recesses in the track frame guide and a securing element is disposed in the other of the recesses in the track frame guide and in the recess in the shaft. This means that the shaft can only fit in the track frame guide in one position and that the shaft cannot be rotated after it has received the securing element. A predetermined position of the shaft enables one to know when the hollow space in the shaft is full of lubricating oil and so that a sump will be formed in the bottom of the space where dirt from the oil will collect and will not flow to rotating parts where it would cause damage and so that there will be a greater flow of oil to the rotating parts. A seal is provided between the track roller and the track frame guide. This seal needs to be lubricated when it is installed on the vehicle. If it is not lubricated it will burn up. A predetermined position of the shaft will assure that the seal will be lubricated when it is installed. It is old to secure the shaft to the track frame guide by a securing element in a concentric recess in the shaft. By providing an eccentric recess in the shaft the securing element not only secures the shaft to the track frame guide but also mounts the shaft in a predetermined position in the track frame guide and prevents the shaft from rotating after it has been installed on the vehicle without added cost.

Figure 1:
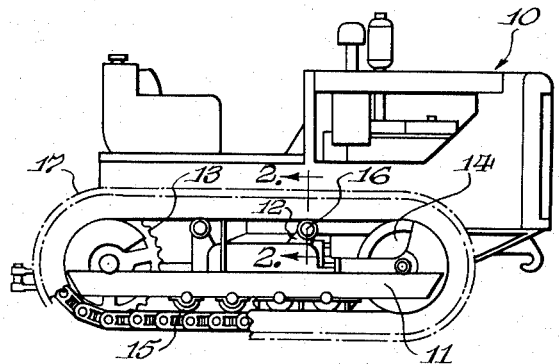
Figure 1 is a side elevational view of a crawler tractor.
Figure 2:
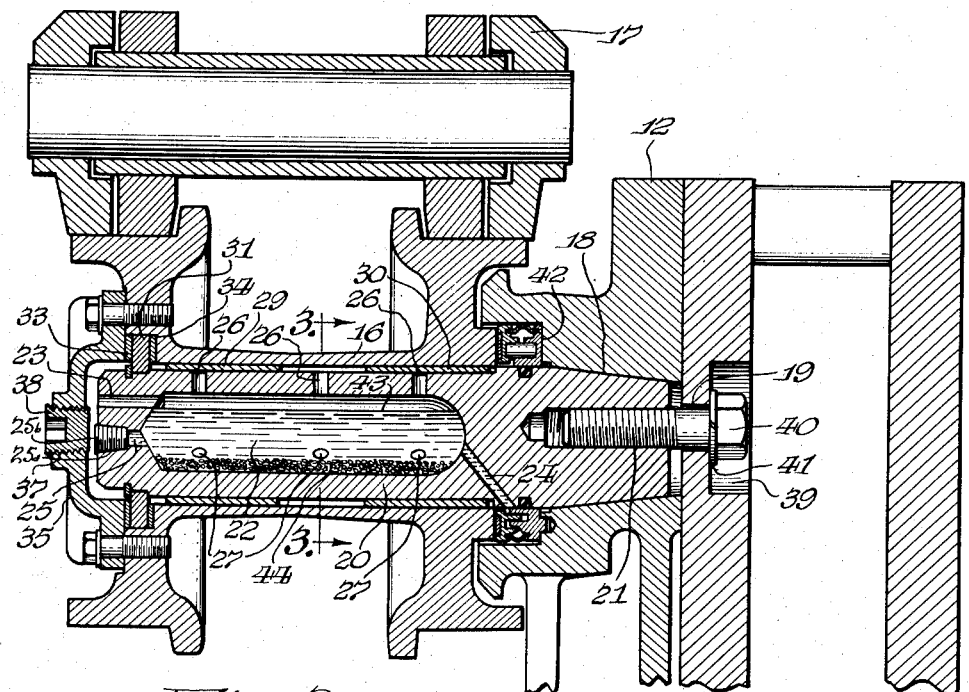
Figure 2 is a cross sectional view taken on the line 2—2 of Figure 1 showing the mounting of the track roller on the tractor.
Figure 3:
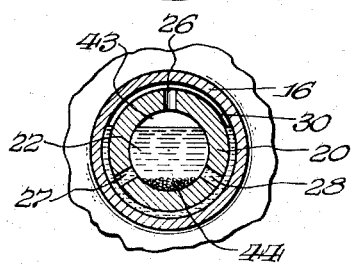
Figure 3 is a cross sectional view taken on the line 3—3 of Figure 2.

In the drawings, 10 generally designates a crawler tractor having a track frame 11, track frame guides or roller shaft supporting structures 12 fixed to the track frame and extending upwardly therefrom, a drive sprocket 13, a front idler 14, lower track rollers 15, upper track rollers 16, and an endless track 17. The invention is concerned with the upper track rollers 16 although not necessarily limited thereto. Each track frame guide 12 is provided with a tapered recess 18 extending inwardly from the outside of the tractor and a hole 19 communicating between recess 18 and another recess 39. The hole 19 and recess 39 are eccentric to the principal axis of the tapered recess 18. Each track roller 16 is comprised of a shaft 20 provided with an eccentric threaded recess 21 extending inwardly from one end thereof and the periphery of the shaft adjacent to and contiguous with said one end is tapered to fit in the tapered recess 18. The shaft 20 has a hollow oil containing space 22 therein and an opening 23 extends inwardly from the other end of the shaft and merges with the space 22 and an opening 24 extends from the space 22 to the periphery of the shaft and an opening 25 extends inwardly from said other end of the shaft. The shaft 20 also has openings in three different planes extending transversely of the shaft and the openings in each plane are identically arranged. Each plane has three openings 26, 27 and 28 spaced 120 degrees apart. A pair of spaced bushings 29 and 30 are disposed on the shaft 20 and the roller 16 is mounted on the bushings. A thrust plate 31 is disposed on the shaft 20 and a snap ring 32 holds the thrust plate on the shaft and washers 33 and 34 are disposed on opposite faces of the thrust plate. A cap 35 is disposed over the outer end of the shaft 20 and is secured to the roller 16 by four bolts 36. The cap 35 has a threaded opening 37 and a threaded plug 38 is disposed in the opening. A securing element 40 such as a machine screw has a shockproof washer 41 disposed thereon and the securing element is disposed in the recess 39 and hole 19 in the track frame guide and is screwed into the recess 21 in the shaft. A seal 42 is disposed between the track frame guide 12 and the roller 16. After the track roller 16 has been installed on a new tractor the plug 38 is removed from cap 35 and a hand operated oil containing gun is disposed in opening 25 and oil is moved into the space 22 until it reaches a level indicated by line 43. When the oil starts flowing out openings 23 and 37 this indicates that the space 22 is full. Thus it is important that opening 23 be maintained in its uppermost position as indicated in Figure 2. It is also important that opening 24 be maintained in its lowermost postion as shown in Figure 2 so that the seal 42 will be sufficiently lubricated at the time of its installation on the tractor. It is also important that openings 27 and 28 be maintained in the position shown in Figure 3 so that dirt will settle in the area 44 between the openings and will not be carried out the openings to the bushings 29 and 30 and the thrust plate 31 and seal 42. The eccentric location of the securing element 40 means that the shaft 20 can only be installed in the correct way, that is, with the openings 23 and 26 in their uppermost position and the opening 24 in its lowermost position. The eccentric location of the securing element 40 also means that the shaft 20 cannot rotate while the tractor is in use thus assuring that the sump area 44 will be formed between openings 27 and 28 and the maintaining of openings 27 and 28 in their installed position means that there will be a greater flow of oil to lubricate the bushings 29 and 30, thrust plate 31 and seal 42.

What is claimed is:

1. In a track roller support; a roller shaft supporting structure having opposite sides, a conical recess in one side and diminishing in diameter as a direct function of depth and a hole communicating between such recess and the other side of such structure and disposed eccentric to such recess; a track roller journal and lubricator shaft for non-rotative mounting on said supporting structure, said shaft embodying a lubricant-containing reservoir and having lubricant conducting passages leading from the reservoir that are to be predeterminedly positioned circumferentially of the shaft and thus require circumferential orientation of the shaft when it is mounted, the shaft also having a conical end portion at one end of the same taper as the conical recess, and the shaft further having a threaded recess extending axially into such one end thereof eccentrically of the principal axis of the conical end portion, said conical end portion being inserted into the supporting structure recess where the threaded recess registers coaxially with the hole in the supporting structure when the shaft is orientated as aforesaid; and a threaded fastening element inserted through said hole and turned into the threaded recess to maintain said orientation and to secure the shaft conical portion firmly seated in the conical recess of the mounting structure.

2. A track roller journal and lubricator shaft embodying a lubricant-containing reservoir, the shaft having lubricant conducting passages communicating with the reservoir, the shaft also having a conical end portion at one end thereof and coaxial with the shaft, and the shaft also having a threaded recess extending axially into said one end thereof eccentrically of the principal axis of the conical end portion.

References Cited in the file of this patent

UNITED STATES PATENTS

| | | |
|---|---|---|
| 2,049,693 | Eberhard | Aug. 4, 1936 |
| 2,349,898 | Bechman | May 30, 1944 |
| 2,362,443 | Bechman | Nov. 14, 1944 |
| 2,666,674 | Deffenbaugh | Jan. 19, 1954 |
| 2,690,933 | Bechman | Oct. 5, 1954 |